(12) United States Patent
Garvey

(10) Patent No.: US 6,476,814 B1
(45) Date of Patent: Nov. 5, 2002

(54) DISPLAY STRUCTURE FOR REPRESENTATION OF COMPLEX SYSTEMS

(75) Inventor: Robert B. Garvey, Lake Lotawana, MO (US)

(73) Assignee: Wordgraph, Inc., Lake Lotawana, MO (US)

( * ) Notice: Subject to any disclaimer, the term of this patent is extended or adjusted under 35 U.S.C. 154(b) by 0 days.

(21) Appl. No.: 09/104,909

(22) Filed: Jun. 25, 1998

(51) Int. Cl.[7] .............................................. G06T 11/20
(52) U.S. Cl. ...................................................... 345/440
(58) Field of Search ......................................... 345/440

(56) References Cited

U.S. PATENT DOCUMENTS 4,953,106 A * 8/1990 Gansner et al.
5,522,022 A * 5/1996 Rao et al. ..................... 345/440
5,808,615 A * 9/1998 Hill et al. ..................... 345/356
6,091,424 A * 7/2000 Madden et al. ............. 345/433

* cited by examiner

Primary Examiner—Jeffery Brier
(74) Attorney, Agent, or Firm—Philip H. Albert; Townsend & Townsend & Crew LLP

(57) ABSTRACT

A multi-dimensional outline, a wordgraph, represents a subset of a directed graph with a given starting node where all edges related to a node in one direction, either incident out of that node or incident into that node appear indented below that node as in outlining represented by their terminal node or initial node respectively and all edges related in the other direction appear indented above that node represented by their initial node or terminal node, respectively, with the initial nodes and terminal nodes distinguished.

10 Claims, 2 Drawing Sheets

DISPLAY STRUCTURE FOR REPRESENTATION OF COMPLEX SYSTEMS

A Computer Program Listing Appendix containing the following files:

testclass.java 3 KB
wordgraph.java 17 KB
edge.java 1 KB
line.java 2 KB
digraph.java 4 KB
node.java 1 KB
tempEdge.java 1 KB
tempNode.java 1 KB on two identical copies of compact discs created on Jul. 16, 2002 for application Ser. No. 09/104,909 is hereby incorporated by reference.

BACKGROUND OF THE INVENTION

The present invention relates in general to the field of automated graph drawing and display.

Complex systems are being used with increasing frequency. Examples of complex systems include a highway system connecting cities, a telephone system providing communication connections among a group of businesses with telephone, computers, fax machines and beepers, and a genealogical family tree. Complex systems are also used in the organization of distributed data base information systems and artificial neural networks.

These complex systems each can be described, explained and illustrated as a collection of objects and connecting paths between selected pairs of the objects. The mathematical model for these systems is a directed graph. A directed graph, $G=(V,E)$, is defined by a set and a collection: a finite set, V, of elements (also referred to as "nodes") and a finite collection, E, of elements of ordered pairs of nodes (also referred to as "edges"). Each ordered pair of nodes comprises an initial node and a terminal node. With directed graphs, an edge is "incident out of" its initial node and is "incident into" its terminal node.

An "incidence list" for a directed graph is a list of all the edges that are incident into or incident out of each node of the directed graph. An "incident out" list for a node is a subset of the incidence list containing the edges which are incident out of that node. Likewise, an "incident in" list for a node is a subset of the incidence list containing the edges which are incident into that node.

FIG. 1 is an illustration of one representation of a directed graph 10, with the nodes labeled n1, n2, n3, etc. and the edges labeled e1, e2, e3, etc. As shown, a node is represented by a circle and an edge is represented by a line segment or arc segment between two nodes. The initial node and terminal node of the edge are distinguishable by the edge's "orientation" represented by an arrow on the edge pointing from the initial node to the terminal node.

The comprehension of a complex system from its representative pictorial representation of its representative directed graph is relatively easy when the graph contains only a few nodes and few edges (i.e., G has a small number of elements). However, when the number of nodes or the number of edges is great, the resulting dense directed graph and the represented system becomes difficult to understand. Additionally, a visual representation of a dense directed graph is not easily rendered for display on computer output devices nor is it convenient to electronically transmit such a graph. These problems have been associated with dense directed graphs of static information, and even more problems exist where the complex system is dynamic.

Examples of system models which can be represented mathematically by directed graphs include data flow diagrams, subroutine-call graphs, program nesting trees, object-oriented class hierarchies, class interfaces and entity-relationship (ER) diagrams for software engineering, matrix organizational charts, use-case diagrams, process flow charts for business process management, petri nets and state transition diagrams for real-time system modeling, PERT charts and activity trees for decision support systems, knowledge-representation (KR) diagrams, conceptual graphs, Bayesian networks, concept charts, semantic networks and associative networks for artificial intelligence and knowledge representation, SLD-trees for logic programming, concept lattices for medical science, evolutionary trees for biology, molecular drawings for chemistry, family trees for. genealogy and network diagrams for communications theory and network engineering.

There are numerous ways to model and render complex systems that share the concepts of directed graphs. The nodes of directed graphs generally represent atomic or elemental concepts or things. Terms such as entity or element are analogous to a directed graph node indicating indivisibility or at least unique identity. The edges of directed graphs represent associations, relationships, paths, links or connections between pairs of nodes and those terms are used interchangeably with directed graph edges depending on the model.

Because of the combinatorial and geometric nature of the systems modeled and the wide array of application domains, research on graph drawing has been conducted in such diverse areas such as discrete mathematics (topological graph theory, geometric graph theory, order theory), algorithmics (graph algorithms, data structures, computational geometry) and human-computer interaction (visual languages, graphical user interfaces, software visualization). For an example of the rich literature available on the subject of graph drawing see "Algorithms for Drawing Graphs: An Annotated Bibliography", *Computer Geometric Theory and Applications,* G. Di Battista, P. Eades, R. Tamassia and I. G. Tollis 4(5):235–282 (1994), which is incorporated by reference herein for all purposes.

Much effort has gone into developing better, faster, more readable and newer ways to draw, present, use, traverse, search and understand graphs, including arbitrary directed graphs.

Practitioners in fields dealing with complex systems strive to recognize, define, arrange and depict, according to some system, the elementary concepts and relationships between these elementary concepts derived from observation, study, experimentation, design and agreement. For example, biological taxonomists strive to agree on the classification of plants and animals. They use formal systems to recognize the discovery of new species and relate them to their classification scheme. Computer network administrators strive to document and communicate the design, implementation and maintenance of their networks including their nodes and connections using network diagrams and other tools and thus they must define each node, the connections (edges) between nodes and their orientations in some cases.

One method for representing complex systems is termed "exposition", using text to convey relationships. Using text to convey an understanding of relationships between entities is pervasive. For example, in the sentence: "Prince Charles is the son of Queen Elizabeth II.", a relationship between two entities is presented. Exposition is limited as a way of representing complex systems because of the large number of words, which would be necessary to describe and represent even a small number of relationships. Another limitation of exposition is that any mental pictures of the system are left to the listener or reader. Of course, textual exposition has the advantage of being easily communicated. Exposition is considered a linear ("one-dimensional") data type of information visualization.

Another method used to display complex systems or relationships is termed "tabulation". Tables A and B provide an example of tabulation. FIG. 1 shows a graphical representation of a directed graph. Tables A and B provide the same information, albeit in a less graphical form.

TABLE A

Node Table

| ID | Name |
|----|------|
| 0  | n1   |
| 1  | n2   |
| 2  | n3   |
| 3  | n4   |
| 4  | n5   |
| 5  | n6   |
| 6  | n7   |

TABLE B

Edge Table

| ID | Name | Initial Node | Terminal Node |
|----|------|--------------|---------------|
| 0  | e1   | n1           | n2            |
| 1  | e2   | n1           | n2            |
| 2  | e3   | n1           | n3            |
| 3  | e4   | n3           | n1            |
| 4  | e5   | n2           | n4            |
| 5  | e6   | n3           | n4            |
| 6  | e7   | n4           | n4            |
| 7  | e8   | n5           | n6            |
| 8  | e9   | n4           | n4            |

The directed graph may be conceptualized as tables representing the collections of a graph $G=(V,E)$. In the above example, Tables A and B represent the nodes in the graph and the collection of edges, respectively. Each element (row) of Table A provides an ID (a unique numeric identifier for the node) and a Name (a unique name or label applied to the node). Each element (row) of Table B provides an ID (a unique numeric identifier for the edge), a Name (a unique name or label indication of the initial node and terminal node for the edge.

Tabulation can be used to accurately reflect the nature of complex systems. As with exposition the mental picture of the underlying system is left to the reader.

Yet another method of representing a system is an outline. An example of outlining is an outline of a speech, where the speech is organized into the major headings of an introduction, a body and a conclusion. Under each of those major headings, words or phrases capturing the essence of the points to be made in those sections are listed under the major heading and indented. While traditional outlining uses a numbering scheme, another form of outlining, nested bullet lists, demonstrates that the indentation of sub-points below main points conveys the nature of the relationship between the sub-headings and their parent headings. An outline represents the relationships between the outline's headings and subheadings, subheadings and sub-subheadings and so forth. Because of its nature and common uses, outlining is confined to representing sets of relationships that are hierarchical and organizable into a tree structure with a single root. This hierarchical nature is also called "single inheritance". Outlining is generally considered to be a powerful tool for understanding, modeling and organization, but outlines or tree structures can not represent arbitrarily complex systems or arbitrary directed graphs. Conversely, however, a directed graph can represent an outline or tree structure.

One prior art method of displaying data about relationships on a computer display device is an outline control (or "widget"), also called a "tree" control or "tree view" control. And as implied by the name, such controls are limited to displaying trees or outlines which are hierarchies. An example of the use of an outline control is the file dialog program used to visually represent the directories and files within computer systems. Most computer operating systems employ a hierarchical organization of their files, so these controls do a complete and accurate job of representing the relationships of the directories, subdirectories and files. In addition to the basic outline representation, the user has the ability to expand and contract or zoom in and zoom out on the view of structures and substructures. In a specific embodiment of such a control, a plus-sign ("+") is placed in front of the entity which has its subtree contracted. This shows that an expansion is possible and clicking on that plus-sign object will cause an expansion of the subtree. Once expanded, the control shows the child entities by listing them below and indented and often connected with lines. These now exposed entities may have additional child entities associated to them, which may also be capable of expansion, and so on.

From an information visualization perspective, items in a tree view can have only one parent and no item can have a subset which contains itself. Thus, a limitation of outline or tree controls is that they can only represent hierarchical or tree relationships.

Another method used to model complex systems is Entity-Relationship (ER) diagramming. Variations of ER diagramming are used for a variety of database design and system engineering methods, Computer Aided System Engineering (CASE) tools and for other disciplines. These variations comprise different constructs and employ different diagrammatic notations but share elemental concepts. In an ER diagram, an entity (or object, thing, class, node, etc.) and the relationship (or relation, association, connection or association) are displayed.

ER diagramming has many variations, but generally, entities are represented as bounded figures, such as rectangles, circles or rounded rectangles and relationships are represented as lines or arcs drawn between pairs of entities. Entities are generally labeled with a name and relationships are labeled with a phrase representing the nature of the relationship. ER diagrams can contain additional information about the entities and relationships represented. An ER diagram can be represented as a pictorial directed graph and is generally modeled mathematically as a directed graph. In an ER diagram, there is no implicit parentage or superiority of one entity over another, nor is there an implicit root, starting point or focus of attention.

ER diagramming has several disadvantages, such as requiring relatively large amounts of space to present each entity compared to a textual list, a difficulty following the lines (relationships) between entities as the number of relationships increase, the difficulty of revising the ER diagram as the underlying system changes and the lack of an implicit focus or perspective for the user.

As with most graphical presentations, emphasis can be placed on one element over another. For example, centrally locating the most important entity might be a way to emphasize that entity and locating important entities around that entity might be a way to emphasize their relative importance. However, the user of the graphic presentation may have interest in some other entity or relationship and wish to emphasize that entity or relationship over another at one time and not at another. Without at least some redrawing, this might not be possible with an ER diagram.

When ER diagrams are computerized for computerized display, most of the drawbacks are still present. Even revisions can cause the user to move entities around and make tradeoffs of the overall presentation. Much of the effort in preparing ER diagrams is expended to direct the program where to place entities, what size they should be, whether page breaks should occur and various other aesthetic and practical considerations. Some computerized ER diagramming tools provide for automatic placement of elements, but the results may not be satisfactory. If the complex system being modeled is dynamic and it is desirable for the model to be dynamic, the resources required for graphical presentation can be burdensome. Another shortcoming of automated ER diagramming relates to the communication of the data necessary to produce a graph electronically. Much of the data necessary for storage of automated ER diagrams relates to the graphical nature and thus is more resource intensive when the information is to be communicated.

Complex systems can be represented by network diagrams, with similar disadvantages. As with ER diagramming, a network diagram is graphical, often using circles to represent nodes of a network and lines to represent connections. Network diagrams are closely related to directed graphs, but are usually represented as undirected graphs. A network node is analogous to a directed graph node and a connection is analogous to an edge. Network diagrams can be represented by directed graphs. Complex system models can also be represented on computer devices using a network diagramming program. Network diagramming programs, methods and apparatus have the same shortcomings as ER diagramming.

Numerous other methods for depicting directed graphs and their computer implementations exist, however they all share, to varying degrees, similar shortcomings with ER diagramming.

SUMMARY OF THE INVENTION

In one embodiment of a display system according to the present invention, an arbitrarily complex system is represented by a "wordgraph" structure on a computer output device, such as an interactive display or a printed output. A wordgraph is a multi-dimensional outline representing a subset of a directed graph with a given starting node with each edge related to a node in one direction (either incident into the node or incident out of the node) being indented in one direction relative to the node and edges related to the node in the other direction being indented in another direction. For example, the edges related in one direction might be above the node and the edges related in the other direction might be below the node.

Any node from the collection of nodes can be used as the starting node of the displayed wordgraph. The display system can display, or prepare for subsequent display, a node as a text string, alone, implied or with any other information configured by the user to appear with the node as a string. This string might be placed at the lowest level, at the left hand margin of the conceptual or actual textual display.

The display system might present an edge from a presented node by presenting the terminal node of the edge on a line below the presented node and indented one level. In so doing, the display system assigns a level of one greater than the current level to the presented node. If any edges are incident into the presented node, those edges are presented by showing the initial node of each such edge on a line above the presented node and indented one level in a unique way such that it is recognizable as being an edge incident into the presented node in a way opposite of those having been place below the presented node. Edges incident into a node are thus distinguished from edges incident out of that node.

DESCRIPTION OF THE SPECIFIC EMBODIMENTS

Figure 1:
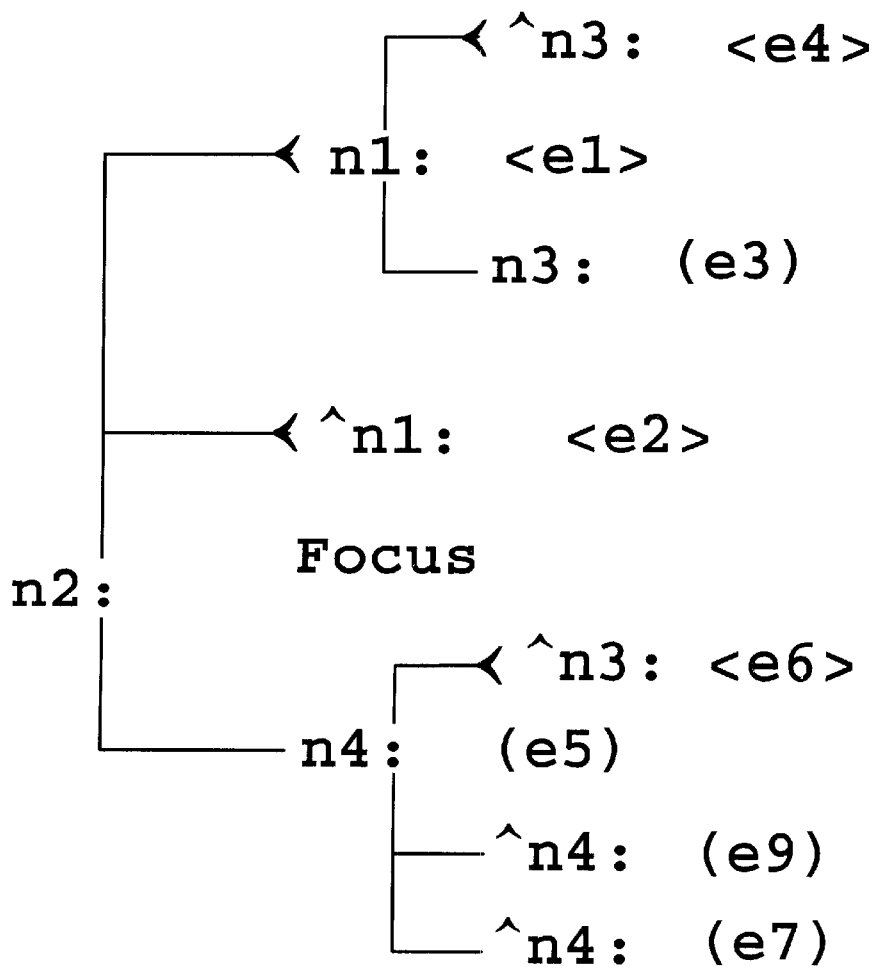
FIG. 1 is an illustration of a conventional directed graph.
Figure 2:
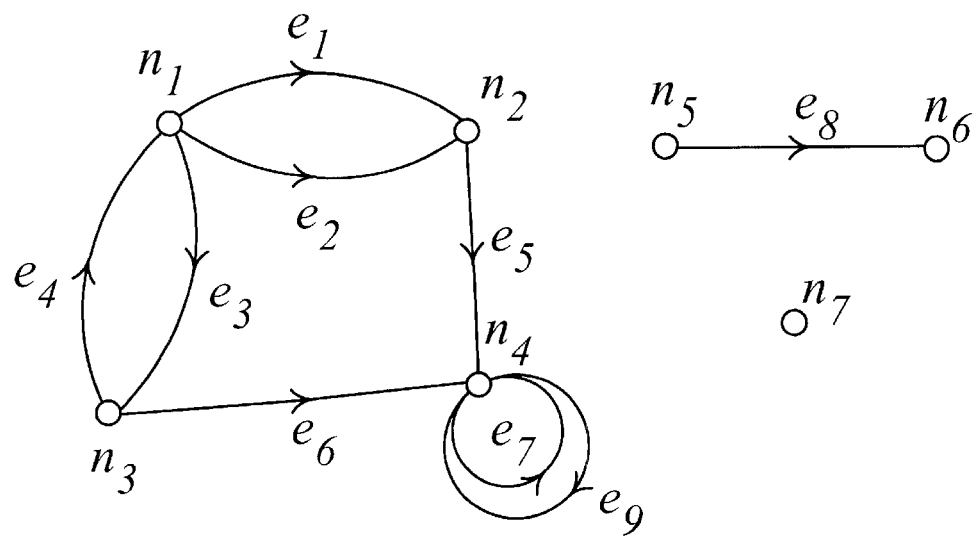
FIG. 2 is an illustration of a wordgraph according to one embodiment of the present invention.

The present invention provides the methods and apparatus to display or output to display or output to computer devices accurately and unambiguously models of complex systems, represented as directed graphs and their nodes and edges in a multi-dimensional outline form. The resulting display of a complex system model in this fashion is called a "wordgraph". A wordgraph resembles an outline but has additional notational features which extend the concept of an outline to render complex systems, giving it multi-dimensionality. A wordgraph can be in a textual or character format, which is printable on character printers, easy to read, and easy to understand. It can reside on computer storage devices or can be communicated.

In one example shown in the figures, some lines of the wordgraph are presented with a leading less than symbol "<" to indicate the node represented by that line is the initial node of the edge represented by the line. Edges might be uniquely presented by using a different type style, color or other distinguishing characteristic. The display system does not limit what is presented on the line representing the edge recognized here, nor does it restrict what it is that distinguishes the line above from the line below the subject node.

The display system comprises methods able to track the use, placement, location and level of the recognized edges and nodes for subsequent consideration. Generally, the level is equivalent to the number of indentations as in outlining where the starting node is not indented and thus has a level of 0. Edges incident into or out of this level will be at level 1. Their presented node will also be assigned that level if not previously presented.

The display system is able under user control or through a predetermined pattern to take each line now presented, representing a presented node and an edge, and treat the presented node on that line as the subject node in a manner similar to the methods used above with the starting node. Each presented node not previously presented is in turn compared to the initial nodes of each unpresented edge and if equal the edge is placed below the subject node as in outlining. Each subject node is compared to the terminal node of edges that have not been presented and if equal places them above the subject node in a unique way as previously described. These identified edges and nodes are marked as presented. The subject node is marked as expanded.

The display system is able to repeat this process until there are no nodes which are marked as presented that are not marked as expanded.

The display system provides methods to present edges and nodes in an order opposite to the way just described, that is, instead of recognizing the equality of the terminal node of an edge with the subject node it recognizes the equality of the initial node of that edge and instead of recognizing the equality of the initial node of an edge with the subject node it recognizes the equality to the terminal node of that edge.

The complex display system provides methods able to recognize those nodes and edges which are not involved in any paths followed from the starting node.

The display system is able to provide a user or call method with access to information about the directed graph, wordgraph and other associate and derived data for mathematical manipulation and presentation. The display system assumes that there is a data store available containing the directed graph.

The current invention also assumes that there are many alternative methods for display of data and text using general purpose digital computer. For exposition purposes the inventor will assume some basic capabilities of word processing or text editing programs, including but not limited to, inserting a line of text in an existing document or widget, either above or below an existing line, indenting a fixed or standard amount of space. It also assumes the ability to work with a 'Collection', 'Set' or 'Linked List' where references or objects can be stored, inserted above some existing entry, below some existing entry, delete an entry and have access to entries. For the example, written in Java, the construct for implementing the Collection is the Vector, which is referenced in the description.

Starting at the next paragraph and ending with the label "End of Program", the text of this description was an output of an example program (a listing of which is provided in the Appendices), edited slightly for readability. The example program comprises Java (tm) language classes and the execution begins with the class "Testclass.java".

This description, these words, can be found in the various source files starting with testclassjava around line 15. The source files can be found in Appendix A. A new directed graph object, a "wordgraph", is created to contain the example directed graph. The example nodes and edges, the building blocks of the directed graph are now created and added to the directed graph. This is the list of nodes of the directed graph: [n1, n2, n3, n4, n5, n6, and n7]. This is the list of edges of the directed graph: [e1, e2, e4, e5, e6, e7, e8, and e9]. The following is a list of Nodes and related Edge information for the example. This is incidence information. Edges incident out of a node are distinguished from edges incident into a node. For node n1 the edges incident out are: e1, e2, e3, and the edge incident into is: e4. For node n2 the edge incident out is: e5 and the edges incident into are: e1, e2. For node n3 the edges incident out are: e4, e6, and the edge incident into is: e3. For node n4 the edges incident out are: e7, e9, and the edges incident into are: e5, e6, e7, e9. For node n5 the edge incident out is: e8, and there are no edges incident into. For node n6 there are no edges incident out, and the edge incident into is: e8. For node n7 there are no edges incident out, and there are no edges incident into. A wordgraph will now be created using the example digraph just created and the starting node is n2. For a Wordgraph to be created it must have available to it a directed graph and the identifier of a starting node. The traversal and presentation of a directed graph as a wordgraph requires a starting node even if it is arbitrarily chosen. This starting node must be an element of the collection of nodes from the directed graph. The first wordgraph line to be created and entered into the wordgraph Line collection is the special case line that represents the starting node, also called the focus. Note that the level is 0 and that is the level given to the first line. This means that it is the lowest level. We now traverse the directed graph a level at a time following all edges incident to each node considered. Are there nodes based at this level that are not expanded? Yes, so method moreToWork returns TRUE. Note. the subjectnode is referenced as 1 its label is n2. We now follow paths from nodes based at the current level, which is 0, which have not previously been presented. Are there nodes based at this level that are not expanded? Yes, so method moreToWork returns TRUE. Note: the subjectnode is referenced as 1 its label is n2. If there are edges incident out of the subject node that have not been previously presented they will be presented now. The edge, e5, has not been previously presented. Its initial node is n2 and its terminal node is n4. We will now create a line in the wordgraph. The terminal node has not been presented so it will be considered the base line for that node. A new line is created and a reference to it is inserted in a Vector below the reference to the subject node to which it is related. If there are edges incident into the subject node that have not been previously presented they will be presented now. The edge, e1, has not been previously presented. Its terminal node is n2 and its initial node is n1. The initial node has not been presented so it will be considered the base line for that node. A new line is created and a reference to it is inserted in a Vector above the reference to the subject node to which it is related. The edge, e2, has not been previously presented. Its terminal node is n2 and its initial node is n1. The initial node has been presented so it will be identified as an agent node and contain a back reference to the line where it is presented. A new line is created and a reference to it is inserted in a Vector above the reference to the subject node to which it is related. The subject node has been expanded and marked as such. Are there nodes based at this level that are not expanded? No, so method moreToWork returns FALSE.

The level is incremented by 1, so it is now 1. Are there nodes based at this level that are not expanded? Yes, so method moreToWork returns TRUE. Note: the subjectnode is referenced as 0 its label is n1. We now follow paths from nodes based at the current leve1, which is 1, which have not previously been presented. Are there nodes based at this level that are not expanded? Yes, so method moreToWork returns TRUE. Note: the subjectnode is referenced as 0 its label is n1. If there are edges incident out of the subject node that have not been previously presented they will be presented now. The edge, e1, has been previously presented. The edge, e2, has been previously presented. The edge, e3, has not been previously presented. It's initial node is n1 and it's terminal node is n3. We will now create a line in the wordgraph. The terminal node has not been presented so it will be considered the base line for that node. A new line is created and a reference to it is inserted in a Vector below the reference to the subject node to which it is related. If there are edges incident into the subject node that have not been previously presented they will be presented now. The edge, e4, has not been previously presented. It's terminal node is n1 and it's initial node is n3. The initial node has been presented so it will be identified as an agent node and contain a back reference to the line where it is presented. A new line is created and a reference to it is inserted in a Vector above the reference to the subject node to which it is related. The subject node has been expanded and marked as such. Are there nodes based at this level that are not expanded? Yes, so method moreToWork returns TRUE. Note: the subjectnode is referenced as 3 its label is n4. If there are edges incident out of the subject node that have not been previously presented they will be presented now. The edge, e7, has not been previously presented. It's initial node is n4 and it's terminal node is n4. We will now create a line in the wordgraph. The terminal node has been presented so it will be identified as an agent node and contain a back reference to the line where it is presented. A new line is created and a reference to it is inserted in a Vector below the reference to the subject node to which it is related. The edge, e9, has not been previously presented. It's initial node is n4 and it's terminal node is n4. We will now create a line in the wordgraph. The terminal node has been presented so it will be identified as an agent node and contain a back reference to the line where it is presented. A new line is created and a reference to it is inserted in a Vector below the reference to the subject node to which it is related. If there are edges incident into the subject node that have not been previously presented they will be presented now. The edge, e5, has been previously presented. The edge, e6, has not been previously presented. It's terminal node is n4 and it's initial node is n3. The initial node has been presented so it will be identified as an agent node and contain a back reference to the line where it is presented. A new line is created and a reference to it is inserted in a Vector above the reference to the subject node to which it is related. The edge, e7, has been previously presented. The edge, e9, has been previously presented. The subject node has been expanded and marked as such. Are there nodes based at this level that are not expanded? No, so method moreToWork returns FALSE.

The level is incremented by 1, so it is now 2. Are there nodes based at this level that are not expanded? Yes, so method moreToWork returns TRUE. Note: the subjectnode is referenced as 2 its label is n3. We now follow paths from nodes based at the current level, which is 2, which have not previously been presented. Are there nodes based at this level that are not expanded? Yes, so method moreToWork returns TRUE. Note: the subjectnode is referenced as 2 its label is n3. If there are edges incident out of the subject node that have not been previously presented they will be presented now. The edge, e4, has been previously presented. The edge, e6, has been previously presented. If there are edges incident into the subject node that have not been previously presented they will be presented now. The edge, e3, has been previously presented. The subject node has been expanded and marked as such. Are there nodes based at this level that are not expanded? No, so method moreToWork returns FALSE.

The level is incremented by 1, so it is now 3. Are there nodes based at this level that are not expanded? No, so method moreToWork returns FALSE.

All the levels and all the paths connected to the starting node have been traversed and prepared for presentation. Remaining nodes that have not been presented should be recognized and any paths from them should be traversed. A rough presentation of the wordgraph follows. A 'less than' symbol, <, is used at the beginning of a line to show that the direction of the edge represented by the line is from the line to the adjacent node below and at the next higher level, it is less indented. A caret symbol, ^, is used to show that node presented is presented elsewhere in the wordgraph and is fully expanded there. This node is considered an agent node, which means that no paths are followed from this node and the count of all types of nodes in the wordgraph can be greater than the number of nodes in the collection of nodes in the directed graph which is the basis of any wordgraph.

The wordgraph follows:

<^n3: <e4>
<n1: <e1>
  n3: (e3)
<^n1: <e2>
  n2: Focus
    <^n3: <e6>
n4: (e5)
  ^n4: (e9)
  ^n4: (e7)

Some Edges of the example digraph may not be on the path started at the Focus or starting node. The Id of the Edge not on the path is 7. Some Nodes of the example digraph may not be on the path started at the Focus or starting node. Ids of Nodes not on the path are: 4, 5 and 6.

End of Program.

As shown above, complex systems can be represented as by wordgraphs and a simple embodiment of a wordgraph can be presented completely in text. An additional feature of drawn wordgraphs are that no lines need be crossed in the drawn wordgraph. A graphical implementation of wordgraph extends current capabilities of tree controls, including expansion, contraction, icons and the use of a variety of colors and fonts to display any complex system. When traversing a directed graph, the distinction between edges incident into and edges incident out of nodes, generally ignored in traversal systems, is maintained. With the above system, the display of structure is not limited to well-founded sets. Non-well-founded sets, also called hypersets, are also capable of being displayed as wordgraphs. In fact, there are number of systems based on hypersets that could be modeled with wordgraphs. Such systems may have self referencing nodes, where the initial node and terminal node of an edge are the same. such systems may have multiple edges between the same pair of nodes.

There has been described herein a novel method for displaying models of complex systems. Various modifications will become apparent to those skilled in the art from the foregoing description and accompanying material. Accordingly, the present invention is to be limited solely by the scope of the following claims.

What is claimed is:

1. In a computer, having a memory and a display, a method of displaying a representation of a complex structure stored in the memory, the method comprising the steps of:

identifying nodes and edges in the complex structure;

selecting one of the nodes in the complex structure as a focus for display;

generating a display image, displayable using text characters, wherein representations of nodes linked to the focus by edges including an edge incident out of the focus are offset in a first direction and representations of nodes linked to the focus by edges including an edge incident into the focus are offset in a second direction; and displaying the display image on the display.

2. The method of claim 1, wherein the first direction is an opposite direction from the second direction.

3. The method of claim 1, wherein the first direction and the second direction are indentation directions.

4. The method of claim 1, wherein the display is a computer monitor.

5. The method of claim 1, wherein the display is a printer.

6. The method of claim 1, further comprising generating a display image wherein representations of nodes linked to subject nodes at a level greater than the focus by edges including an edge incident out of the subject node are offset in a first direction and representations of nodes linked to the subject node by edges including an edge incident into the focus are offset in a second direction.

7. The method of claim 1, wherein nodes incident out of the focus are down and to the right.

8. The method of claim 7, wherein nodes incident into the focus are up and to the right.

9. A computer system, comprising:

means for storing a listing of nodes and edges representing a complex system, wherein each edge has a direction and is incident out of a node and incident into a node;

means for storing a selection of a node in the complex structure as a focus for display;

means for generating a display image, displayable using text characters, representing the complex system wherein representations of nodes linked to the focus by edges including an edge incident out of the focus are offset in a first direction and representations of nodes linked to the focus by edges including an edge incident into the focus are offset in a second direction; and means for displaying the display image.

10. The computer system of claim 9, further comprising:

means for selecting a different node in the complex structure as a focus for display; and means for regenerating a new display image based on the different node in the complex structure as a focus for display.

* * * * *